Sept. 28, 1954  P. SCHLUMBOHM  2,690,498
CIGARETTE LIGHTER
Filed Dec. 13, 1951
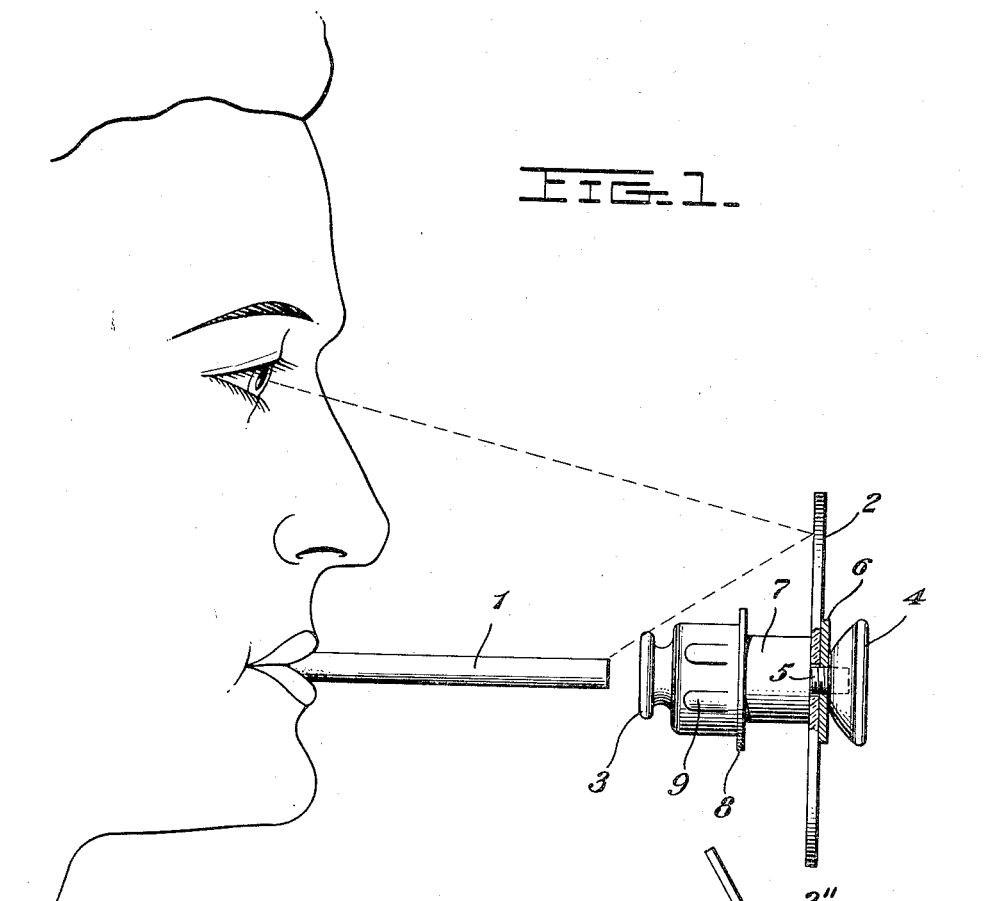
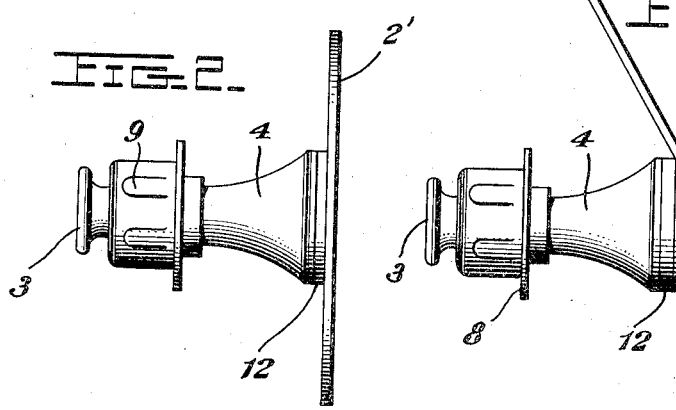
INVENTOR Patented Sept. 28, 1954

2,690,498

UNITED STATES PATENT OFFICE 2,690,498

CIGARETTE LIGHTER

Peter Schlumbohm, New York, N. Y.

Application December 13, 1951, Serial No. 261,481

2 Claims. (Cl. 219—32)

The present invention relates to a cigarette lighter, more specifically to the type of electric cigarette lighters such as used in automobiles.

Such cigarette lighters are now on the market, removably mounted in the dashboard. They are heated electrically by a time switch. The removable part is the actual burner and will be referred to as "burner" in the specification.

My invention is illustrated by way of example in Figs. 1 to 3 of the drawings wherein:

Figure 1 is a side view in elevation of one form of the invention;

Fig. 2 is a side view in elevation of a modified form of the invention; and

Fig. 3 is a side view in elevation of another modification of the invention.

Referring to the drawings, Fig. 1 shows a heater equipped with a mirror 2. The heater comprises the coil chamber 3, the handling knob 4, a washer 6, a piston element 7, the dashboard-contact rim 8, and spring tongues 9. Figure 1 illustrates that a person with a cigarette 1 in his mouth will be able to view in a mirror and thereby to align the tip of the cigarette 1 and the coil chamber 3. The dotted line shows the optical reflection.

It is a fact that many automobile accidents happen due to the manipulation of the present cigarette lighters by the driver. It seems that the following features of the present manipulation are detrimental to the control of the car:

(a) The driver is forced to change the focusing of his eyes from the long-distance focusing of the road to the extremely near tip of the cigarette 1.

(b) Moreover, while doing this, the eye is focusing on a red glowing coil. To let the eye view, especially during night driving, the red glowing coil, is in a very dangerous way a handicap for the eye in looking again at the road. The eye suffers from this momentary viewing of the red coil, not only concerning general susceptibility of intensity of light but also concerning distinction of colors.

(c) The aligning always involves a kind of fumbling which takes the full attention of the driver off the road for several seconds.

(d) The aligning is never perfect and results nearly always in a mechanical brush-off which spreads some of the newly ignited tobacco over the suit of the driver and cover of the seat. This again requires the attention of the driver to eliminate such glowing parts.

While the applied technical means of my new invention may seem simple, it takes invention to analyze the trouble of the old lighter and to add optical means which will cure the above faults in every point as follows:

Concerning (a), the line of vision is much longer now compared with viewing without a mirror. This means that the near focus is not any more as inconvenient and as great a contrast to focusing the roads, as before. This means seeing-comfort and also safety by quicker re-adjustment when again looking at the road.

Concerning (b), the picture in the mirror does not show the glowing coil.

Concerning (c), the time required for the aligning is reduced to a safe minimum.

Concerning (d), again there will be no such trouble if the aligning is facilitated by my new invention.

The mirror 2 may be arranged at a right angle to the axis of the burner, as shown in Figures 1 and 2; or, as shown in Figure 3, the mirror 2" may be at an angle with the axis of the burner tilted towards the coil chamber 3. This arrangement has not only optical advantages but it also reduces over-all dimensions.

It is advantageous to arrange the mirror as far away from the coil chamber 3 as possible. This is shown in Figure 2, where the mirror 2' is mounted at the extreme opposite end of the burner, e. g. by glue 12. The mirror is mounted on the handling knob 4 but actually the mirror 2' becomes the gripping knob.

As shown in Figure 1, the mirror may also be attached to the burner by means of a hole 5 in the mirror, adapted to fit on the threaded shaft of the gripping knob 4. A washer 6 and a specially long piston member 7 may assist the fixation of the mirror.

Having now described the nature of my invention and shown by way of example the manner in which it may be performed I claim as my invention:

1. A dashboard type cigarette lighter comprising a plug igniter element and handle element in axial alignment, said plug igniter element including an electrical heating coil, a mirror mounted on said lighter in back of said igniter element with the reflecting surface thereof facing in the same direction as said igniter element whereby when said heating coil is energized and turned toward the user a cigarette will be reflected and the mirror will serve as an optical guide to obtain contact between a cigarette to be lighted and the energized plug igniter element with a minimum of strain on the eye muscles to effect change of focus and whereby the glow from said igniter element will not be reflected in said mirror.

2. In a dashboard type cigarette lighter, a plug igniter element having an electrically heated coil positioned therein, a handle element disposed in axial alignment with said plug igniter element and a mirror mounted on said lighter in back of said igniter element with the reflecting surface facing in the same general direction as said igniter element, said mirror being disc-like in shape, the axis of which is coaxial with said lighter, whereby when said heating coil is energized and turned toward the user a cigarette will be reflected and the mirror will serve as an optical guide to obtain contact between a cigarette to be lighted and the energized plug igniter element with a minimum of strain on the eye muscles to effect change of focus and whereby the glow from said igniter element will not be reflected in said mirror.

References Cited in the file of this patent

UNITED STATES PATENTS

| Number | Name | Date |
|---|---|---|
| 85,636 | Brandon | Jan. 5, 1869 |
| 344,115 | Kampfe | June 22, 1886 |
| 1,043,029 | Parkhurst | Oct. 29, 1912 |
| 1,757,255 | Mahan | May 6, 1930 |
| 1,921,254 | Hammeral | Aug. 8, 1933 |
| 2,120,238 | Brush | June 14, 1938 |
| 2,196,151 | Johnson | Apr. 2, 1940 |
| 2,275,922 | Reyburn | Mar. 10, 1942 |

FOREIGN PATENTS

| Number | Country | Date |
|---|---|---|
| 325,103 | Italy | Feb. 28, 1935 |